(12) United States Patent
Enokida et al.

(10) Patent No.: US 11,794,504 B2
(45) Date of Patent: Oct. 24, 2023

(54) PROTECTIVE LAYER TRANSFER SHEET

(71) Applicant: Dai Nippon Printing Co., Ltd., Tokyo (JP)

(72) Inventors: Kazuki Enokida, Tokyo (JP); Yusaku Akiyama, Tokyo (JP); Mitsuhiro Oota, Tokyo (JP); Shigeta Mori, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 516 days.

(21) Appl. No.: 16/980,068

(22) PCT Filed: Feb. 25, 2019

(86) PCT No.: PCT/JP2019/006989
§ 371 (c)(1),
(2) Date: Sep. 11, 2020

(87) PCT Pub. No.: WO2019/187869
PCT Pub. Date: Oct. 3, 2019

(65) Prior Publication Data
US 2021/0178797 A1 Jun. 17, 2021

(30) Foreign Application Priority Data
Mar. 29, 2018 (JP) .................. 2018-064965

(51) Int. Cl.
*B41M 5/44* (2006.01)
*B41M 7/00* (2006.01)
(Continued)

(52) U.S. Cl.
CPC ................ *B41M 5/44* (2013.01); *B32B 7/06* (2013.01); *B32B 27/20* (2013.01); *B32B 27/302* (2013.01);
(Continued)

(58) Field of Classification Search
CPC .. B41M 5/382; B41M 5/38264; B41M 5/395; B41M 5/44; B41M 5/446; B41M 7/0027;
(Continued)

(56) References Cited

U.S. PATENT DOCUMENTS

2002/0160160 A1 10/2002 Suzuki et al.
2015/0258834 A1 9/2015 Yabe et al.

FOREIGN PATENT DOCUMENTS

EP 1 275 518 A1 1/2003
EP 2 868 476 A1 5/2015
(Continued)

OTHER PUBLICATIONS

International Search Report and Written Opinion (Application No. PCT/JP2019/006989) dated May 21, 2019.

*Primary Examiner* — Gerard Higgins
(74) *Attorney, Agent, or Firm* — BURR PATENT LAW, PLLC

(57) ABSTRACT

To provide a protective layer transfer sheet that can produce a print having excellent abrasion resistance and an excellent glossiness.

A protective layer transfer sheet 100 including a transfer layer 10 provided on one surface of a substrate 1, wherein the transfer layer 10 has a single-layer structure composed only of a protective layer 5 or a layered structure in which the protective layer 10 is located nearest to a side of the substrate 1, and the protective layer 5 contains a styrene resin and a particulate organofluorine compound.

2 Claims, 1 Drawing Sheet

(51) Int. Cl.
*B32B 7/06* (2019.01)
*B32B 27/30* (2006.01)
*B32B 27/20* (2006.01)

(52) U.S. Cl.
CPC .......... *B41M 5/446* (2013.01); *B41M 7/0027* (2013.01); *B32B 2264/0257* (2013.01); *B32B 2264/303* (2020.08); *B41M 2205/02* (2013.01); *B41M 2205/30* (2013.01); *B41M 2205/40* (2013.01)

(58) Field of Classification Search
CPC .......... B41M 2205/02; B41M 2205/30; B41M 2205/40
See application file for complete search history.

(56) References Cited

FOREIGN PATENT DOCUMENTS

| | | |
|---|---|---|
| EP | 3 053 740 A1 | 8/2016 |
| JP | H08-230338 A1 | 9/1996 |
| JP | 2002-240404 A1 | 8/2002 |
| JP | 2003-039836 A1 | 2/2003 |
| JP | 2004-066656 A1 | 3/2004 |
| JP | 2005-262690 A1 | 9/2005 |
| JP | 2008-149509 A1 | 7/2008 |
| JP | 2009-066896 A1 | 4/2009 |
| JP | 2014-080018 A1 | 5/2014 |
| JP | 2019-064152 A1 | 4/2019 |

PROTECTIVE LAYER TRANSFER SHEET

TECHNICAL FIELD

The present invention relates to protective layer transfer sheets.

BACKGROUND ART

Sublimable type thermal transfer methods have been widely used to form a thermal transferred image on a transfer receiving article because such methods can easily form high-quality images equivalent to conventional full-color photographic images and having excellent transparency and high reproducibility and high gradation of neutral tints. As prints in which a thermal transferred image has been formed on a transfer receiving article, there are known digital photographs, and identification (ID) cards, which are used in various fields, such as identity cards, driver's license cards, membership cards, and the like.

Formation of a thermal transferred image by a sublimable type thermal transfer method is conducted by combining a thermal transfer sheet having a colorant layer provided on one surface of a substrate with a transfer receiving article, for example, a thermal transfer image-receiving sheet having a receiving layer provided on one surface of another substrate and applying energy onto the back side of the thermal transfer sheet with a heating device such as a thermal head to cause the colorant contained in the colorant layer to be transferred onto the transfer receiving article.

However, the thermal transferred image formed by the sublimable type thermal transfer method described above has a disadvantage such as inferior durability including abrasion resistance because the colorant is not a pigment but a dye having a relatively low molecular weight. Then, usually, for a thermal transferred image formed by the sublimable type thermal transfer method, a protective layer transfer sheet having a protective layer is used to transfer the protective layer onto the thermal transferred image to thereby improve the durability. Recently, thermal transferred images having durability as well as a high glossiness have been highly required. In this case, the protective layer located on the outermost surface after transfer is required to have good durability and a good glossiness. As the protective layer transfer sheet, for example, those suggested in Patent Literatures 1 and 2 are known.

CITATION LIST

Patent Literature

Patent Literature 1: Japanese Patent Laid-Open No. 2005-262690
Patent Literature 2: Japanese Patent Laid-Open No. 2002-240404

SUMMARY OF INVENTION

Technical Problem

The present invention has been made in view of such situations, and the present invention aims principally to provide a protective layer transfer sheet that can produce a print having good abrasion resistance and a good glossiness.

Solution to Problem

A protective layer transfer sheet according to an embodiment of the present disclosure for solving the above problems has a transfer layer provided on one surface of a substrate, the transfer layer has a single-layer structure composed only of a protective layer or a layered structure in which the protective layer is located nearest to a side of the substrate, and the protective layer contains a styrene resin and a particulate organofluorine compound.

Additionally, the particulate organofluorine compound may have a particle size of 2 µm or more and 5 µm or less.

The content of the particulate organofluorine compound may be 2% by mass or more and 35% by mass or less based on the total mass of the protective layer.

Advantageous Effects of Invention

According to the protective layer transfer sheet of the present disclosure, it is possible to produce a print having good abrasion resistance and a good glossiness by transferring the transfer layer.

DESCRIPTION OF EMBODIMENTS

<<Protective Layer Transfer Sheet>>

Hereinafter, a protective layer transfer sheet 100 according to an embodiment of the present disclosure (hereinafter, it is referred to as the protective layer transfer sheet of the present disclosure) will be described concretely using drawings.

Figure 1:
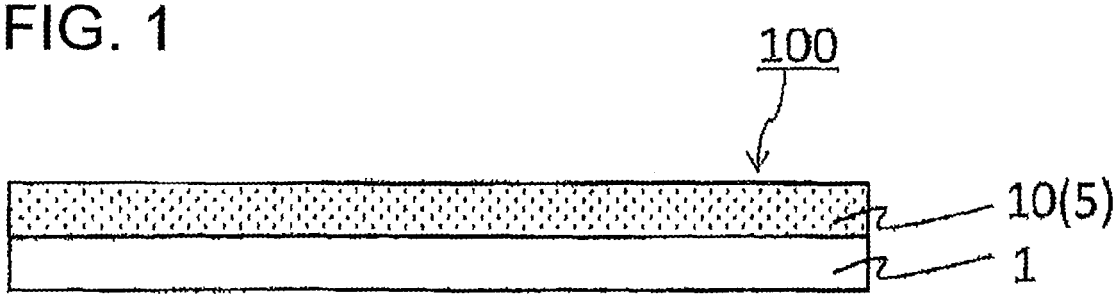
FIG. 1 is a schematic sectional view illustrating one example of a protective layer transfer sheet of the present disclosure.
Figure 2:
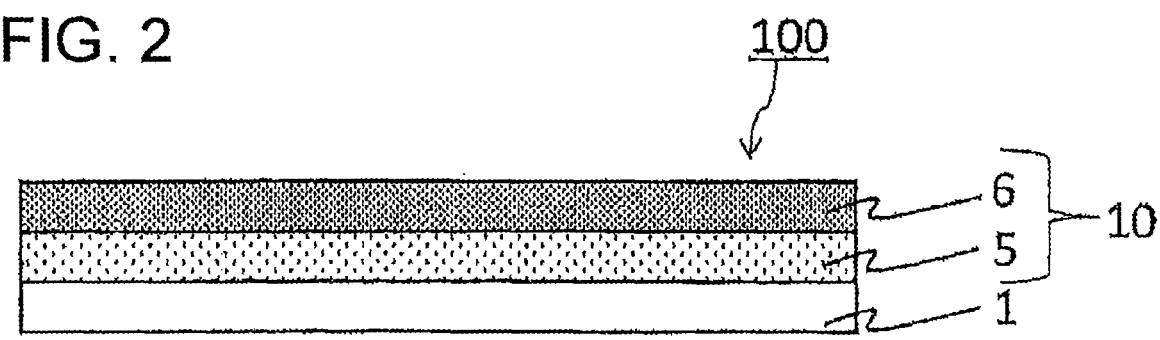
FIG. 2 is a schematic sectional view illustrating one example of a protective layer transfer sheet of the present disclosure.
Figure 3:
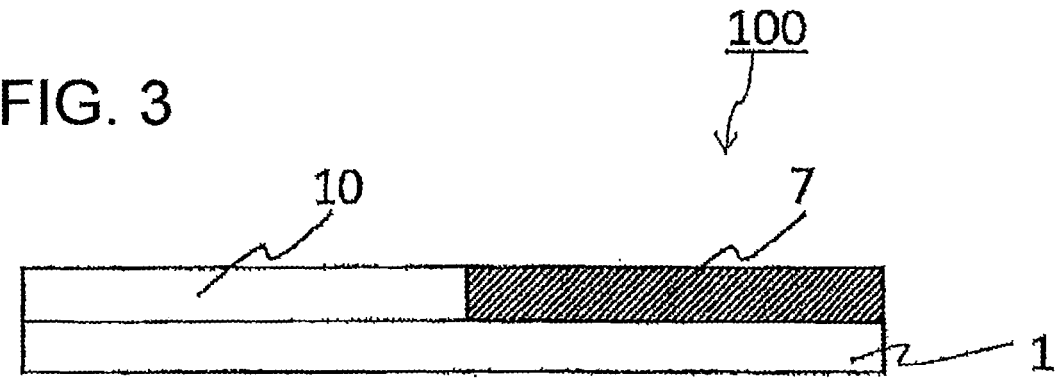
FIG. 3 is a schematic sectional view illustrating one example of a protective layer transfer sheet of the present disclosure.

As shown in FIGS. 1 to 3, the protective layer transfer sheet 100 of the present disclosure includes a substrate 1 and a transfer layer 10 provided on the substrate 1. The transfer layer 10 is a layer that is peeled at the surface of the transfer layer 10 on the side of the substrate 1 and is transferred onto a transfer receiving article.

The transfer layer 10 is a single-layer structure composed only of a protective layer or is composed of a plurality of layers including a protective layer. The transfer layer 10 of the aspect shown in FIG. 1 has a single-layer structure composed only of a protective layer 5, and the transfer layer 10 of the aspect shown in FIG. 2 has a layered structure in which a protective layer 5 and an adhesive layer 6 are layered in this order from the side of the substrate 1. Note that the protective layer 5 constituting the transfer layer 10 is a layer located on the outermost surface when the transfer layer 10 is transferred onto a transfer receiving article. Accordingly, in the case where the transfer layer 10 has a layered structure, the protective layer 5 is located nearest to a side of the substrate 1, among the layers constituting the transfer layer 10. Hereinafter, each constituent of the protective layer transfer sheet 100 of the present disclosure will be explained.

(Substrate)

The substrate 1, which is an essential constituent in the protective layer transfer sheet 100 of the present disclosure, includes the transfer layer 10 and the like. There is no limitation on the material of the substrate 1, and the material desirably has heat resistance and mechanical properties. As the substrate 1 like this, examples can include various plastic films or sheets of polyesters such as polyethylene terephthalate, polycarbonate, polyimide, polyetherimide, cellulose derivatives, polyethylene, polypropylene, styrene resins, acrylic resins, polyvinyl chloride, polyvinylidene chloride, nylon, and polyether ether ketone. The thickness of the substrate 1 may be appropriately set depending on the kind of the material of the substrate 1, so that the strength and heat resistance lie in appropriate ranges. The thickness is generally 2.5 µm or more and 100 µm or less.

(Transfer Layer)

As shown in FIGS. 1 to 3, the transfer layer 10 is provided on the substrate 1. The transfer layer 10 has a single-layer structure composed only of a protective layer 5 (see FIG. 1) or has a layered structure in which a protective layer 5 is located nearest to a side of the substrate 1 (see FIG. 2). Note that the transfer layer 10 of the aspect shown in FIG. 2 has a layered structure in which the protective layer 5 and an adhesive layer 6 are layered in this order from the side of the substrate 1. The transfer layer 10 of the aspect shown in FIG. 3 includes both the single-layer structure and the layered structure, and a depiction of the protective layer 5 is omitted. The transfer layer 10 is not limited to the aspects shown and is only required to satisfy the condition that it includes the protective layer 5. For example, in the aspect shown in FIG. 2, the transfer layer 10 may have a structure in which a primer layer is provided between the protective layer 5 and the adhesive layer 6 in order to improve the adhesion between the protective layer 5 and the adhesive layer 6 or may have a structure in which various functional layers are provided on the protective layer 5.

(Protective Layer)

The protective layer 5 contains, as essential components, a styrene resin and particulate organofluorine compound particles. Hereinafter, the particulate organofluorine compound may be referred to as organofluorine compound particles.

According to the protective layer transfer sheet 100 of the present disclosure, in which the protective layer 5 constituting the transfer layer 10 contains a styrene resin and organofluorine compound particles, it is possible to produce a print having good abrasion resistance and a good glossiness by transferring the transfer layer 10 including the protective layer 5 onto a transfer receiving article. In other words, it is possible to impart a good glossiness and abrasion resistance to the protective layer 5 by causing the protective layer 5 to contain a styrene resin and organofluorine compound particles.

In the protective layer transfer sheet 100 of the present disclosure, the styrene resin serves to impart a good glossiness to the protective layer 5, and the organofluorine compound particles serve to impart good abrasion resistance to the protective layer 5.

The styrene resin referred to herein includes not only homopolymers of a styrene monomer but also copolymers of a styrene monomer and another monomer. In the case where, as the styrene resin, a copolymer of a styrene monomer and another polymer other than an acrylic monomer is used, in other words, in the case where the styrene resin does not contain an acrylic monomer as a constituent monomer, the copolymerization ratio of the styrene monomer is preferably 50% or more. The copolymerization ratio referred to herein means a molar ratio.

On the other hand, in the case where as the styrene resin, a copolymer of a styrene monomer and an acrylic monomer is used, in other words, in the case where the styrene resin contains an acrylic monomer as a constituent monomer, both the copolymerization ratio of the styrene monomer and the copolymerization ratio of the acrylic monomer are preferably 20% or more, and the copolymerization ratio of the styrene monomer is preferably 50% or more. The total of the copolymerization ratio of the styrene monomer and the copolymerization ratio of the acrylic monomer is preferably 80% or more. Examples of the acrylic monomer include acrylic monomers such as acrylic acid, methacrylic acid, acrylic acid esters, and methacrylic acid esters.

The content of the styrene resin is not limited, but in the case where, as the styrene resin, a homopolymer of a styrene monomer or a copolymer of a styrene monomer and another monomer other than acrylic monomers is used, the content of the styrene resin is preferably 70% by mass or more, more preferably 90% by mass or more based on the total mass of the protective layer 5. On the other hand, in the case where, as the styrene resin, a copolymer of a styrene monomer and an acrylic monomer (styrene-acrylic copolymer) is used, the content of the styrene resin is preferably 10% by mass or more, more preferably 15% by mass or more, even more preferably 50% by mass or more based on the total mass of the protective layer 5. It is possible to impart a better glossiness to the protective layer 5 by setting the content of the styrene resin to the preferred content described above. The preferred upper limit value of the styrene resin is only required to be appropriately determined in accordance with the contents of the organofluorine compound particles and other optional components.

Examples of the organofluorine compound particles can include PTFE (polytetrafluoroethylene) particles, PFA (tetrafluoroethylene-perfluoroalkyl vinyl ether copolymer) particles, FEP (tetrafluoroethylene-hexafluoropropylene copolymer) particles, ETFE (tetrafluoroethylene-ethylene copolymer) particles, PVDF (polyvinylidene fluoride) particles, PCTFE (polychlorotrifluoroethylene) particles, and ECTFE (chlorotrifluoroethylene-ethylene copolymer) particles. Among these, PTFE particles are preferable organofluorine compound particles in respect of their capability of imparting better abrasion resistance to the protective layer 5. Other organofluorine compound particles than PTFE particles also may be used. The protective layer 5 may contain one type of these organofluorine compound particles singly or may contain two or more types of these organofluorine compound particles.

There is no particular limitation on the particle shape of the organofluorine compound particles. The shape thereof may be any shape such as a spherical shape, a scaly shape, a flat shape, a spindle shape, a polygonal shape, a dome shape, or an amorphous shape. The shape may be other shapes than these.

There is no limitation on the particle size of the organofluorine compound particles, and the particle size is only required to be appropriately determined in accordance with the thickness of the protective layer 5 and the content of the organofluorine compound particles. The protective layer 5 of the preferred aspect contains organofluorine compound particles having a particle size calculated by the following calculation method or a volume particle size D50 of 2 µm or more and 5 µm or less. It is possible to impart better abrasion resistance to the protective layer 5 while sufficiently maintaining the glossiness imparted to the protective layer 5 by causing the protective layer 5 to contain organofluorine compound particles having a particle size of 2 µm or more and 5 µm or less. Specifically, it is possible to enhance the smoothness of the surface of the protective layer 5 on the side of the substrate 1 and to sufficiently maintain the glossiness of the protective layer 5 imparted by the styrene resin by causing the protective layer 5 to contain organofluorine compound particles having a particle size of 5 μm or less. Additionally, it is possible to impart better abrasion resistance to the protective layer 5 by causing the protective layer 5 to contain organofluorine compound particles having a volume particle size of 2 μm or more.

(Method of Calculating Particle Size)

The particle size of the organofluorine compound particles can be determined by a method of directly measuring the size of primary particles from a micrograph of a vertical cross section of the protective layer transfer sheet. Specifically, the minor axis diameter and major axis diameter of the primary particles are measured, and the average thereof is taken as the particle size of the primary particles. The particle size of 100 particles is measured in the same manner, and the average thereof is taken as the average particle size. The particle size to be calculated by the method of calculating the particle size means this average particle size. The same result can be obtained using either of a transmission electron microscope (TEM) or a scanning electron microscope (SEM).

The volume particle size D50 referred to herein means the diameter of the particles at which the accumulated volume reaches 50% in a particle size distribution on a volume basis.

There is no limitation on the content of the organofluorine compound particles, and the content of the organofluorine compound particles is preferably 2% by mass or more and 35% by mass or less based on the total mass of the protective layer 5. It is possible to impart better abrasion resistance to the protective layer 5 while sufficiently maintaining the glossiness imparted to the protective layer 5 by setting the content of the organofluorine compound particles to the preferred content described above. Specifically, it is possible to enhance the smoothness of the surface of the protective layer 5 on the side of the substrate 1 and to sufficiently maintain the glossiness of the protective layer 5 to be imparted by the styrene resin by setting the content of the organofluorine compound particles to 35% by mass or less. Additionally, it is possible to impart better abrasion resistance to the protective layer 5 by setting the content of the organofluorine compound particles to 2% by mass or more.

In the case where protective layer 5 contains the organofluorine compound particles having a particle size of less than 3 μm, the content of the organofluorine compound particles having a particle size of less than 3 μm is more preferably more than 10% by mass based on the total mass of the protective layer 5. In the case where the protective layer 5 contains an organofluorine compound having a particle size of 3 μm or more and less than 4 μm, the content of the organofluorine compound particles having a particle size of 3 μm or more and less than 4 μm is more preferably more than 3% by mass based on the total mass of the protective layer 5. In the case where the protective layer 5 contains an organofluorine compound having a particle size of 4 μm or more, the content of the organofluorine compound particles having a particle size of 4 μm or more is preferably 2% by mass or more based on the total mass of the protective layer 5.

In the protective layer 5 of a more preferred aspect, the particle size and the content of the organofluorine compound particles satisfy the preferred particle size and content described above.

The protective layer 5 may also contain optional components together with the styrene resin and organofluorine compound particles as the essential components. Examples of the optional components can include polyvinyl chloride, polyvinyl acetate, polyesters, acrylic resins, polycarbonate, phenoxy resins, ultraviolet absorbing resins, epoxy resins, polyurethane, acryl-modified urethane resins, acryl urethane resins such as urethane-modified acrylic resins, resins obtained by silicone-modifying these resins, mixtures of these resins, ionizing radiation curable resins, and ultraviolet absorbing resins.

Subsequently, one example of the protective layer 5 containing a styrene-acrylic copolymer obtained by copolymerizing a styrene monomer as a styrene resin and an acrylic monomer will be described.

The protective layer 5 containing a styrene-acrylic copolymer preferably further contains a vinyl chloride-vinyl acetate copolymer. According to the protective layer 5 of this aspect, it is possible to improve the adhesion between the transfer layer 10 and a constituent member in contact with the transfer layer 10, for example, the substrate 1. Thereby, it is possible to prevent unintentional fall-off of the transfer layer 10 from the side of the substrate 1 in advance of transferring the transfer layer 10. The protective layer 5 of this aspect is a suitable aspect in the case where the transfer layer 10 is provided directly on the substrate 1. In the protective layer 5 of the preferred aspect containing a styrene-acrylic copolymer, the content of the styrene-acrylic copolymer and the content of the organofluorine compound particles are the preferred contents described above. The protective layer contains 6% by mass or more and 25% by mass or less of the vinyl chloride-vinyl acetate copolymer based on the total mass of the protective layer 5. According to the protective layer 5 of the preferred aspect, it is possible to improve the adhesion between the transfer layer 10 and a constituent member in contact with the transfer layer 10.

The protective layer 5 containing a styrene-acrylic copolymer preferably contains a resin component having a glass transition temperature (Tg) of 60° C. or less together with the vinyl chloride-vinyl acetate copolymer described above. While the adhesion between the transfer layer 10 and a constituent member in contact with the transfer layer 10 is improved by causing the protective layer 5 containing a styrene-acrylic copolymer to further contain a resin component having a glass transition temperature (Tg) of 60° C. or less together with the vinyl chloride-vinyl acetate copolymer, it is possible to lower the adhesion between the transfer layer 10 and the constituent member in contact with the transfer layer 10 by application of energy during transfer of the transfer layer 10. Thereby, it is possible to improve the transferability of the transfer layer 10. In the protective layer 5 containing a styrene-acrylic copolymer of the preferred aspect, the contents of the styrene-acrylic copolymer, the organofluorine compound particles, and the vinyl chloride-vinyl acetate copolymer are the preferred contents described above. The protective layer 5 contains 6% by mass or more and 60% by mass or less, more preferably 6% by mass or more and 50% by mass or less of the resin component having a glass transition temperature (Tg) of 60° C. or less based on the total mass of the protective layer 5.

The glass transition temperature (Tg) referred to herein means a temperature determined by DSC (differential scanning calorimetry) in compliance with JIS-K-7121 (2012).

In the case where the transfer layer 10 is caused to have a single-layer structure composed only of the protective layer 5 as shown in FIG. 1, it is also possible to further enhance the adhesion between the transfer layer and a transfer receiving article by causing the protective layer 5 to contain a component having the adhesion between the transfer receiving article and the transfer layer 10. The styrene resin is a resin having adhesion, and thus, even in the case where the transfer layer 10 is caused to have a single-layer structure composed only of the protective layer 5, it is possible to transfer the transfer layer 10 onto a transfer receiving article. As the component having adhesion, components explained in the adhesive layer mentioned below can be appropriately selected and used.

The protective layer 5 may be caused to contain various silicone oils, a polyethylene wax, a metal soap such as zinc stearate, zinc stearyl phosphate, calcium stearate, or magnesium stearate, a release agent such as fatty acid amide, polyethylene wax, carnauba wax, or paraffin wax, a known ultraviolet absorbing agent such as a benzophenone type, benzotriazole type, benzoate type, triazine type, titanium oxide, or zinc oxide ultraviolet absorbing agent, a light stabilizer such as a hindered amine type or Ni-chelate type light stabilizer, an antioxidant such as a hindered phenol type, sulfur type, phosphorus type, or lactone type antioxidant, and the like, as required.

There is no particular limitation on the method for forming the protective layer 5. The protective layer may be formed by dispersing or dissolving a styrene resin, organofluorine compound particles, and various additives to be used as required in a suitable solvent to prepare a coating liquid for protective layer, coating this coating liquid on the substrate 1 or an optional layer provided on the substrate 1 (e.g., a release layer to be mentioned below), and drying the coated liquid. Examples of the coating method include a gravure printing method, a screen printing method, and a reverse-coating method using a gravure printing plate. Coating methods other than these methods also may be used. The same applies to coating methods for various coating liquids described below.

There is no particular limitation on the thickness of the protective layer 5, and the thickness is generally 0.5 μm or more and 10 μm or less. In the case where the protective layer 5 is caused to contain the organofluorine compound particles having a preferred particle size described above, the thickness of the protective layer 5 is preferably 0.8 μm or more and 2 μm or less.

(Adhesive Layer)

As shown in FIG. 2, the transfer layer 10 may be caused to have a layered structure in which the protective layer 5 and the adhesive layer 6 are layered in this order from the side of the substrate 1. According to the transfer layer 10 of this aspect, it is possible to impart better adhesion to the transfer layer 10 without causing the protective layer 5 to contain a component that imparts adhesion between the protective layer 5 and an transfer receiving article (component having adhesion).

There is no particular limitation on a component of the adhesive layer, and examples thereof include polyurethanes, polyolefins such as α-olefin-maleic anhydride, polyesters, and resin components such as acrylic resins, epoxy resins, urea resins, melamine resins, phenol resins, polyvinyl acetate, vinyl chloride-vinyl acetate copolymers, and cyano acrylate resins.

The thickness of the adhesive layer 6 is preferably 0.5 μm or more and 10 μm or less. There is no limitation on the method for forming the adhesive layer. The adhesive layer can be formed by dispersing or dissolving, for example, the adhesive exemplified above and additives to be added as required in a suitable solvent to prepare a coating liquid for adhesive layer, coating this coating liquid onto the protective layer 5 or an optional layer provided on the protective layer 5, and drying the coated liquid.

(Release Layer)

A release layer (not shown) may be provided between the substrate 1 and the transfer layer 10. Examples of the components of the release layer may include waxes, silicone wax, silicone resins, silicone-modified resins, fluorine resins, fluorine-modified resins, polyvinyl alcohol, acrylic resins, thermally crosslinkable epoxy-amino resins, and thermally crosslinkable alkyd-amino resins.

The thickness of the release layer is generally 0.5 μm or more and 5 μm or less. There is no limitation on the method for forming the release layer, and the release layer can be formed by, for example, dispersing or dissolving the components described above in a suitable solvent to prepare a coating liquid for release layer, coating this coating liquid on the substrate 1, and drying the coated liquid.

In the case where the release layer is provided on the substrate 1, the surface of the substrate 1 on the side of the release layer may be subjected to adhesive treatment in order to improve the adhesion between the substrate 1 and the release layer. As the adhesive treatment, a known resin surface treatment technique can be applied as it is, for example, corona discharge treatment, flame treatment, ozone treatment, ultraviolet treatment, radiation treatment, roughening treatment, chemical treatment, plasma treatment, low temperature plasma treatment, primer treatment, and grafting treatment. Alternatively, two or more of these treatments may be used in combination.

(Colorant Layer)

As shown in FIG. 3, a colorant layer 7 and the transfer layer 10 described above may be disposed in any order on one surface of the substrate 1. In the protective layer transfer sheet 100 of the aspect shown in FIG. 3, a single colorant layer 7 is provided on one surface of the substrate 1. Alternatively, a plurality of colorant layers, for example, a yellow colorant layer, a magenta colorant layer, a cyan colorant layer, a black colorant layer, and the like may be disposed in any order on one surface of the substrate. When the colorant layer 7 and the transfer layer 10 are taken as "one unit", the "one unit" may be provided repeatedly on one surface of the substrate 1.

According to the protective layer transfer sheet of the aspect shown in FIG. 3, it is possible to form a thermal transferred image on a transfer receiving article and to transfer the transfer layer 10 onto the formed thermal transferred image using one protective layer transfer sheet 100.

The colorant layer 7 as an example contains a binder resin and a sublimable dye. There is no particular limitation on the binder resin contained in the colorant layer 7, and conventional known binder resins in the field of colorant layers can be appropriately selected and used. Examples of the binder resin in the colorant layer 7 may include cellulosic resins such as ethyl cellulose, hydroxyethyl cellulose, ethyl hydroxy cellulose, methyl cellulose, and cellulose acetate, vinyl resins such as polyvinyl alcohol, polyvinyl acetate, polyvinyl butyral, polyvinyl acetoacetal, and polyvinyl pyrrolidone, acrylic resins such as poly(meth)acrylate and poly(meth)acrylamide, and resin components such as polyurethane, polyamide, and polyester.

There is no particular limitation on the content of the binder resin, and the content of the binder resin is preferably 20% by mass or more based on the total mass of the colorant layer 7. It is possible to sufficiently retain the sublimable dye in the colorant layer 7 to thereby improve the storage stability by setting the content of the binder resin to 20% by mass or more based on the total mass of the colorant layer. There is no particular limitation on the upper limit value of the content of the binder resin, and the upper limit value is only required to be appropriately set in accordance with the content of the sublimable dye and optional additives.

There is no particular limitation on the sublimable dye contained in the colorant layer 7. Preferred are sublimable dyes having a sufficient coloring density and undergoing no discoloration or fading due to light, heat, temperature, or the like. Examples of the dye include diarylmethane type dyes, triarylmethane type dyes, thiazole type dyes, merocyanine dyes, pyrazolone dyes, methine type dyes, indoaniline type dyes, azomethine type dyes such as acetophenoneazomethine, pyrazoloazomethine, imidazoleazomethine, imidazoazomethine, and pyridoneazomethine, xanthene type dyes, oxazine type dyes, cyanostyrene type dyes such as dicyanostyrene and tricyanostyrene, thiazine type dyes, azine type dyes, acridine type dyes, benzeneazo type dyes, azo type dyes such as pyridonazo, thiophenazo, isothiazoleazo, pyrroleazo, pyrazoleazo, imidazoleazo, thiadiazoleazo, triazoleazo, and disazo, spiropyran type dyes, indolinospiropyran type dyes, fluoran type dyes, rhodaminelactam type dyes, naphthoquinone type dyes, anthraquinone type dyes, and quinophthalone type dyes. Specific examples may include red dyes such as MS Red G (Mitsui Toatsu Chemicals, Inc.), Macrolex Red Violet R (Bayer AG), Ceres Red 7B (Bayer AG), and Samaron Red F3BS (Mitsubishi Chemical Corporation), yellow dyes such as Holon brilliant yellow 6GL (Clariant), PTY-52 (Mitsubishi Chemical Corporation), and Macrolex yellow 6G (Bayer AG), and blue dyes such as Kayaset(R) Blue 714 (Nippon Kayaku Co., Ltd.), Holon brilliant blue S-R (Clariant), MS blue 100 (Mitsui Toatsu Chemicals, Inc.), and C.I. solvent blue 63.

The content of the sublimable dye is preferably 50% by mass or more and 350% by mass or less, more preferably 80% by mass or more and 300% by mass or less based on the total mass of the binder resin. It is possible to further improve the printing density and storage stability by setting the content of the sublimable dye to the preferred content described above.

(Colorant Primer Layer)

A colorant primer layer (not shown) with a purpose of improving the adhesion between the substrate 1 and the colorant layer 7 may be provided between the substrate 1 and the colorant layer 7.

There is no particular limitation on the colorant primer layer, and conventionally known colorant primer layers in the field of thermal transfer sheets can be appropriately selected and used. A colorant primer layer as an example is constituted by a resin component. Examples of the resin component constituting the colorant primer layer may include resin components such as polyester, polyvinyl pyrrolidone, polyvinyl alcohol, polyacrylic acid esters, polyvinyl acetate, polyurethane, styrene-acrylic copolymers, polyacrylamide, polyamide, polyvinyl acetoacetal, and polyvinyl butyral. The colorant primer layer may also contain various additives such as organic particles and inorganic particles together with these resin components.

There is also no particular limitation on the method for forming the colorant primer layer, and the colorant primer layer can be formed by dispersing or dissolving the resin component exemplified above and additives to be added as required in a suitable solvent to prepare a coating liquid for colorant primer layer, coating this coating liquid on the substrate 1, and drying the coated liquid. There is no particular limitation on the thickness of the colorant primer layer, and the thickness is generally 0.02 µm or more and 1 µm or less.

(Back Face Layer)

A back face layer (not shown) may be provided on the other surface of the substrate 1. Incidentally, the back face layer is an optional constituent in the protective layer transfer sheet of the present disclosure.

The back face layer may be formed by appropriately selecting and using resin(s) from the conventionally known thermoplastic resins and the like. Examples of such a thermoplastic resin may include resin components such as polyesters, polyacrylic acid esters, polyvinyl acetate, styrene-acrylic copolymers, polyurethane, polyolefins such as polyethylene and polypropylene, styrene resins, polyvinyl chloride, polyethers, polyamides, polyimides, polyamide-imides, polycarbonate, polyacrylamide, polyvinyl chloride, polyvinyl acetals such as polyvinyl acetoacetal and polyvinyl butyral, and silicone-modified forms of these. Among them, polyamide-imides or silicone-modified forms thereof are preferably used, from the viewpoint of the heat resistance and the like. These resins may be those prepared by curing with a curing agent. Examples of the curing agent include isocyanate type curing agents.

Further, the back face layer preferably contains various additives, for instance, a release agent such as a wax, a higher fatty acid amide, a phosphoric ester compound, metal soaps, silicone oils, or a surfactant, an organic powder such as fluorine resin, and inorganic particles such as silica, clay, talc, or calcium carbonate, and particularly preferably contains at least one of a phosphoric ester or metal soap, in addition to the thermoplastic resin described, for the purpose of improving the slipping property.

The back face layer can be formed by, for example, dispersing or dissolving the thermoplastic resin described above and various additives to be added as required in a suitable solvent to prepare a coating liquid for back face layer, coating this coating liquid onto the other surface of the substrate 1, and drying the coated liquid. The thickness of the back face layer is preferably 0.1 µm or more and 5 µm or less, more preferably 0.3 µm or more and 2 µm or less, from the viewpoint of improvement in the heat resistance and the like.

(Transfer Receiving Article)

Examples of a transfer receiving article onto which the transfer layer 10 of the protective layer transfer sheet 100 of the present disclosure is to be transferred include thermal transfer image-receiving sheets, plain paper, wood-free paper, tracing paper, plastic films, and plastic cards mainly composed of vinyl chloride, a vinyl chloride-vinyl acetate copolymer, or polycarbonate. As the transfer receiving article, ones having a predetermined image also can be used. The transfer receiving article may be colored or may have transparency.

(Method for Transferring Transfer Layer)

There is no particular limitation on the method for transferring the transfer layer onto a transfer receiving article, and the method can be conducted using, for example, a thermal transfer printer having a heating device such as a thermal head, or a heating device such as hot stamping or a heat roll.

The resins and the like constituting each layer are exemplarily described herein. These resins may be homopolymers of a monomer constituting each resin or may be copolymers of a monomer as the main component constituting each resin and one or more other monomers or derivatives thereof. For example, in the case of a reference to an acrylic resin, the resin is only required to contain an acrylic acid or methacrylic acid monomer or an acrylate or methacrylate monomer as the main component. The resin also may be a modified form of these resins. Alternatively, other resins than those exemplarily described herein may be used.

EXAMPLES

Next, the present invention will be described more concretely with reference to Examples and Comparative Examples. Hereinbelow, unless otherwise particularly specified, the expression of part or % means that by mass, representing a blend not in terms of solid content.

Example 1

A coating liquid for protective layer 1 having the following composition was coated onto a polyethylene terephthalate (PET) film having a thickness of 4.5 μm so as to obtain a thickness of 1 μm in the dried state, and the coated liquid was dried to form a protective layer. Then, a coating liquid for adhesive layer having the following composition was coated onto the protective layer so as to obtain a thickness of 1 μm in the dried state, and the coated liquid was dried to obtain a protective layer transfer sheet of Example 1, in which the protective layer and the adhesive layer were layered in this order on the substrate. Hereinafter, the reference to a transfer layer means a laminate of the protective layer and the adhesive layer. D50 described in Table 2 is a volume average particle size D50.

<Coating liquid for protective layer 1>

| | |
|---|---|
| Styrene resin (as resin (1)) (CR3500, DIC Corporation) | 97 parts |
| Organofluorine compound particles (as particles (1)) (D50: 2.5 μm) (KTL-1N, KITAMURA LIMITED) | 3 parts |
| Methyl ethyl ketone | 200 parts |
| Toluene | 200 parts |

<Coating liquid for adhesive layer>

| | |
|---|---|
| Polyester (Vylon(R) 200, TOYOBO CO., LTD.) | 20 parts |
| Ultraviolet absorbing resin (UVA-635L, BASF Japan) | 10 parts |
| Methyl ethyl ketone | 40 parts |
| Toluene | 40 parts |

Examples 2 to 35 and Comparative Examples 1 to 6

The same procedure as described in Example 1 was repeated, except for replacing the styrene resin (resin (1)) and organofluorine compound particles (particles(1)) in the coating liquid for protective layer 1 by each of resins and particles shown in Table 1 below and forming the protective layer using coating liquids for protective layer in which the amount of each of the resins and particles blended was changed as shown in Table 1 below in order to prepare protective layer transfer sheets of Examples 2 to 35 and Comparative Examples 1 to 6. The details of the resins (1) to (6) and particles (1) to (6) in Table 1 are shown in Table 2. In the coating liquids for protective layer of Examples 2 to 35 and Comparative Examples 1 to 6, the solvent and the amount blended thereof are the same as in the coating liquid for protective layer 1.

TABLE 1

| | Coating liquid for protective layer | | | | | | | |
|---|---|---|---|---|---|---|---|---|
| | Binder | | | | | | Particles | |
| | Type | Amount blended (parts) | Type | Amount blended (parts) | Type | Amount blended (parts) | Type | Amount blended (parts) |
| Example 1 | Resin (1) | 97 | — | | — | | Particles (1) | 3 |
| Example 2 | Resin (1) | 95 | — | | — | | Particles (1) | 5 |
| Example 3 | Resin (1) | 90 | — | | — | | Particles (1) | 10 |
| Example 4 | Resin (1) | 85 | — | | — | | Particles (1) | 15 |
| Example 5 | Resin (1) | 80 | — | | — | | Particles (1) | 20 |
| Example 6 | Resin (1) | 70 | — | | — | | Particles (1) | 30 |
| Example 7 | Resin (1) | 99 | — | | — | | Particles (2) | 1 |
| Example 8 | Resin (1) | 97 | — | | — | | Particles (2) | 3 |
| Example 9 | Resin (1) | 95 | — | | — | | Particles (2) | 5 |
| Example 10 | Resin (1) | 90 | — | | — | | Particles (2) | 10 |
| Example 11 | Resin (1) | 85 | — | | — | | Particles (2) | 15 |
| Example 12 | Resin (1) | 80 | — | | — | | Particles (2) | 20 |
| Example 13 | Resin (1) | 70 | — | | — | | Particles (2) | 30 |
| Example 14 | Resin (1) | 60 | — | | — | | Particles (2) | 40 |
| Example 15 | Resin (1) | 97 | — | | — | | Particles (3) | 3 |
| Example 16 | Resin (1) | 95 | — | | — | | Particles (3) | 5 |
| Example 17 | Resin (1) | 90 | — | | — | | Particles (3) | 10 |
| Example 18 | Resin (1) | 85 | — | | — | | Particles (3) | 15 |
| Example 19 | Resin (1) | 80 | — | | — | | Particles (3) | 20 |
| Example 20 | Resin (1) | 70 | — | | — | | Particles (3) | 30 |
| Example 21 | Resin (1) | 77 | Resin (2) | 10 | Resin (3) | 10 | Particles (2) | 3 |
| Example 22 | Resin (1) | 87 | Resin (2) | 10 | — | | Particles (2) | 3 |
| Example 23 | Resin (1) | 87 | Resin (3) | 10 | — | | Particles (2) | 3 |
| Example 24 | Resin (5) | 97 | | | — | | Particles (2) | 3 |
| Example 25 | Resin (6) | 97 | | | — | | Particles (2) | 3 |
| Example 26 | Resin (6) | 92 | Resin (2) | 5 | — | | Particles (2) | 3 |
| Example 27 | Resin (6) | 87 | Resin (2) | 10 | — | | Particles (2) | 3 |
| Example 28 | Resin (6) | 87 | Resin (2) | 5 | Resin (3) | 5 | Particles (2) | 3 |
| Example 29 | Resin (6) | 77 | Resin (2) | 10 | Resin (3) | 10 | Particles (2) | 3 |
| Example 30 | Resin (6) | 57 | Resin (2) | 20 | Resin (3) | 20 | Particles (2) | 3 |

TABLE 1-continued

| | Coating liquid for protective layer | | | | | | | |
|---|---|---|---|---|---|---|---|---|
| | Binder | | | | | | Particles | |
| | Type | Amount blended (parts) | Type | Amount blended (parts) | Type | Amount blended (parts) | Type | Amount blended (parts) |
| Example 31 | Resin (6) | 33 | Resin (2) | 32 | Resin (3) | 32 | Particles (2) | 3 |
| Example 32 | Resin (6) | 45 | Resin (2) | 20 | Resin (3) | 32 | Particles (2) | 3 |
| Example 33 | Resin (6) | 20 | Resin (2) | 20 | Resin (3) | 57 | Particles (2) | 3 |
| Example 34 | Resin (6) | 87 | Resin (3) | 10 | | | Particles (2) | 3 |
| Example 35 | Resin (6) | 77 | Resin (2) | 10 | Resin (4) | 10 | Particles (2) | 3 |
| Comparative Example 1 | Resin (1) | 100 | | — | | | | 0 |
| Comparative Example 2 | Resin (1) | 97 | | — | | | Particles (4) | 3 |
| Comparative Example 3 | Resin (1) | 95 | | — | | | Particles (4) | 5 |
| Comparative Example 4 | Resin (7) | 100 | | — | | | | 0 |
| Comparative Example 5 | Resin (7) | 97 | | — | | | Particles (4) | 3 |
| Comparative Example 6 | Resin (7) | 95 | | — | | | Particles (4) | 5 |

TABLE 2

| Type | Component | Component details |
|---|---|---|
| Resin (1) | Styrene resin | CR3500, DIC Corporation |
| Resin (2) | Vinyl chloride - vinyl acetate copolymer | SOLBIN(R) CNL, Nissin Chemical Co., Ltd. |
| Resin (3) | Acrylic resin (Tg: 56° C.) | MB-2539, Mitsubishi Chemical Corporation |
| Resin (4) | Acrylic resin (Tg: 63° C.) | MB-2660, Mitsubishi Chemical Corporation |
| Resin (5) | Styrene - acrylic copolymer | BR-52, Mitsubishi Chemical Corporation |
| Resin (6) | Styrene - acrylic copolymer | BR-50, Mitsubishi Chemical Corporation |
| Resin (7) | Acrylic resin | BR-87, Mitsubishi Chemical Corporation |
| Particles (1) | Organofluorine compound particles (D50: 2.5 μm) | KTL-1N, KITAMURA LIMITED |
| Particles (2) | Organofluorine compound particles (D50: 3 μm) | KTL-2N, KITAMURA LIMITED |
| Particles (3) | Organofluorine compound particles (D50: 4 μm) | KTL-8N, KITAMURA LIMITED |
| Particles (4) | Talc | MICRO ACE(R) P-3, Nippon Talc Co., Ltd. |

(Preparation of Print)

A genuine ribbon for a sublimable type thermal transfer printer (DS620, Dai Nippon Printing Co., Ltd.) having a yellow colorant layer, a magenta colorant layer, a cyan colorant layer, and a protective layer repeated in this order was prepared. The protective layer of the genuine ribbon was cut. The protective layer transfer sheet of each of Examples and Comparative Examples was located on the cut protective layer portion to thereby prepare a thermal transfer sheet of each of Examples and Comparative Examples, in which the protective layer transfer sheet of each of Examples and Comparative Examples located on the protective layer portion was linked to adjacent colorant layer portions. That is, the thermal transfer sheet of each of Examples and Comparative Examples was prepared in which only the protective layer portion of a genuine ribbon was replaced by the protective layer transfer sheet of each of Examples and Comparative Examples. Subsequently, a 0/255-graduation black solid image (image gray scale) was printed onto a genuine image-receiving paper for the sublimable type thermal transfer printer as a transfer receiving article using a sublimable type thermal transfer printer (DS620, Dai Nippon Printing Co., Ltd.) and the thermal transfer sheet of each of Examples and Comparative Examples prepared above to thereby obtain an image formed product. Then, the transfer layer of the thermal transfer sheet of each of Examples and Comparative Examples (the transfer layer of the protective layer transfer sheet of each of Examples and Comparative Examples) was transferred onto the image formed product obtained above using the sublimable type thermal transfer printer described above to thereby obtain a print of each of Examples and Comparative Examples.

(Measurement of Gloss Value)

The surface of the print of each of Examples and Comparative Examples obtained in the Preparation of print described above was measured using a gloss value meter (Glossmeter VG7000 (Nippon Denshoku Industries Co. Ltd.)) (measurement angle 20°). The measurement results are shown in Table 3. When the gloss value falls below 50, the print has a low glossiness.

(Abrasion Resistance Evaluation)

The region of the print of each of Examples and Comparative Examples obtained above on which the black solid image had been formed was cut into a width of 3 cm. After a 200-g weight was placed on the print with a test cloth (Kanakin No. 3) interposed therebetween and the print with the weight was reciprocated 10 times, the surface condition of the print was visually observed, and the abrasion resistance was evaluated under the following evaluation criteria. The evaluation results are shown in Table 3.

[Evaluation Criteria]

A: Substantially no change in the surface condition of the transfer layer is observed.

B: The transfer layer remains, but the protective layer is slightly flawed.

C: The transfer layer remains, but the protective layer is flawed.

NG: The transfer layer is detached, or the adhesive layer is flawed.

(Measurement of Density)

The reflection density of the print of each of Examples and Comparative Examples obtained above was measured by a spectrometer (i1-Pro2, X-Rite Inc., Density Status: Ansi-A, no filter). The measurement results are shown in Table 3.

(Peelable Property Evaluation)

The peelable property of the transfer layer of the thermal transfer sheet of each Example (protective layer transfer sheet of each Example) during Preparation of the print described above was evaluated under the following evaluation criteria. The evaluation results are shown in Table 3.

[Evaluation Criteria]

A: During transfer of the transfer layer onto the image formed product, no peeling sound has occurred, and defective transfer of the transfer layer and a peel trace in the print have not occurred.

NG: During transfer of the transfer layer onto the image formed product, any of a peeling sound, defective transfer of the transfer layer, or a peel trace in the print has occurred.

(Adhesion Evaluation)

Tape (Scotch(R) tape (BK-24), 3M Company) was affixed on the adhesive layer of the protective layer transfer sheet of each Example obtained under each condition described above. The adhesion between the polyethylene terephthalate (PET) film and the protective layer was checked when the tape was detached at a peel angle of 90°, and adhesion evaluation was conducted under the following evaluation criteria. The evaluation results are shown in Table 3.

[Evaluation Criteria]

A: The protective layer (transfer layer) is not detached from the substrate.

NG: The protective layer (transfer layer) is detached from the substrate.

TABLE 3

| | gloss value | Abrasion resistance | Density | Peelable property | Adhesion |
|---|---|---|---|---|---|
| Example 1 | 63 | B | 2.05 | A | A |
| Example 2 | 62 | B | 2.04 | A | A |
| Example 3 | 62 | B | 2.04 | A | A |
| Example 4 | 59 | A | 2.00 | A | A |
| Example 5 | 56 | A | 1.97 | A | A |
| Example 6 | 52 | A | 1.91 | A | A |
| Example 7 | 63 | C | 2.06 | A | A |
| Example 8 | 62 | B | 2.06 | A | A |
| Example 9 | 61 | A | 2.05 | A | A |
| Example 10 | 63 | A | 2.05 | A | A |
| Example 11 | 59 | A | 2.00 | A | A |
| Example 12 | 55 | A | 1.97 | A | A |
| Example 13 | 56 | A | 1.93 | A | A |
| Example 14 | 52 | A | 1.91 | A | A |
| Example 15 | 63 | A | 2.05 | A | A |
| Example 16 | 61 | A | 2.05 | A | A |
| Example 17 | 63 | A | 2.05 | A | A |

TABLE 3-continued

| | gloss value | Abrasion resistance | Density | Peelable property | Adhesion |
|---|---|---|---|---|---|
| Example 18 | 58 | A | 2.02 | A | A |
| Example 19 | 57 | A | 1.98 | A | A |
| Example 20 | 53 | A | 1.95 | A | A |
| Example 21 | 60 | B | 2.06 | A | A |
| Example 22 | 61 | B | 2.06 | NG | A |
| Example 23 | 61 | B | 2.06 | A | NG |
| Example 24 | 54 | A | 2.04 | A | NG |
| Example 25 | 60 | A | 2.05 | A | NG |
| Example 26 | 59 | A | 2.05 | NG | A |
| Example 27 | 58 | A | 2.05 | NG | A |
| Example 28 | 60 | B | 2.05 | A | NG |
| Example 29 | 58 | A | 2.05 | A | A |
| Example 30 | 57 | A | 2.05 | A | A |
| Example 31 | 54 | A | 2.05 | NG | A |
| Example 32 | 56 | A | 2.05 | A | A |
| Example 33 | 54 | B | 2.05 | A | A |
| Example 34 | 58 | A | 2.05 | A | NG |
| Example 35 | 54 | B | 2.05 | A | NG |
| Comparative Example 1 | 63 | NG | 2.06 | — | — |
| Comparative Example 2 | 57 | NG | 2.03 | — | — |
| Comparative Example 3 | 53 | NG | 1.94 | — | — |
| Comparative Example 4 | 47 | A | 2.05 | — | — |
| Comparative Example 5 | 47 | A | 2.04 | — | — |
| Comparative Example 6 | 45 | A | 2.02 | — | — |

REFERENCE SIGNS LIST

1 Substrate
5 Protective layer
6 Adhesive layer
7 Colorant layer
10 Transfer layer
100 Protective layer transfer sheet

The invention claimed is:

1. A protective layer transfer sheet comprising a transfer layer provided on one surface of a substrate, wherein
the transfer layer has a single-layer structure composed only of a protective layer or a layered structure in which a protective layer is located nearest to a side of the substrate,
the protective layer contains a styrene resin and a particulate organofluorine compound,
the particulate organofluorine compound has a particle size of 2 μm or more and 5 μm or less, and
a content of the particulate organofluorine compound is 15% by mass or more and 35% by mass or less based on a total mass of the protective layer.

2. The protective layer transfer sheet according to claim 1, wherein the styrene resin is a styrene-acrylic copolymer.

* * * * *